US012372237B2

(12) United States Patent
Houston

(10) Patent No.: US 12,372,237 B2
(45) Date of Patent: Jul. 29, 2025

(54) DEVICE AND METHOD FOR EXTINGUISHING CANDLES

(71) Applicant: ECLIPTIC LLC, West Newbury, MA (US)

(72) Inventor: Benjamin Houston, West Newbury, MA (US)

(73) Assignee: ECLIPTIC LLC, West Newbury, MA (US)

( * ) Notice: Subject to any disclaimer, the term of this patent is extended or adjusted under 35 U.S.C. 154(b) by 391 days.

(21) Appl. No.: 17/980,711

(22) Filed: Nov. 4, 2022

(65) Prior Publication Data

US 2023/0220997 A1 Jul. 13, 2023

Related U.S. Application Data

(60) Provisional application No. 63/298,038, filed on Jan. 10, 2022.

(51) Int. Cl.
*F23Q 25/00* (2006.01)
*F21V 35/00* (2006.01)
*F23D 3/26* (2006.01)

(52) U.S. Cl.
CPC .............. *F23Q 25/00* (2013.01); *F21V 35/00* (2013.01); *F23D 3/26* (2013.01)

(58) Field of Classification Search
CPC ............. F23Q 25/00; F23D 3/26; F21V 35/00
See application file for complete search history.

(56) References Cited

U.S. PATENT DOCUMENTS

| | | | | |
|---|---|---|---|---|
| 6,494,708 B1 * | 12/2002 | Hart | F21V 35/00 431/86 |
| 6,572,365 B1 * | 6/2003 | Byxbe | F23Q 25/00 431/291 |
| 2003/0134242 A1 * | 7/2003 | Hart | F23Q 25/00 431/86 |
| 2007/0031769 A1 * | 2/2007 | Burton | F23Q 25/00 431/144 |
| 2007/0128561 A1 * | 6/2007 | Hart | F23D 3/26 431/291 |
| 2010/0075265 A1 * | 3/2010 | Quinn | F23D 3/16 431/289 |
| 2017/0097157 A1 * | 4/2017 | Simpson | F23Q 25/00 |
| 2017/0268775 A1 * | 9/2017 | Lev | F23Q 25/00 |
| 2017/0276354 A1 * | 9/2017 | Yang | F23Q 25/00 |
| 2018/0031236 A1 * | 2/2018 | Gaudioso | F23N 5/20 |
| 2018/0106478 A1 * | 4/2018 | Chow | F23N 5/245 |

* cited by examiner

*Primary Examiner* — Alfred Basichas
(74) *Attorney, Agent, or Firm* — Richard Kosakowski

(57) ABSTRACT

A candle flame extinguishing device is configured to attach to an opening in a container for a candle. The device includes an aperture that is movable between open and closed (i.e., partially or fully closed) positions. The open position of the aperture facilitates the lighting of the candle wick and the burning of the candle flame. The closed position of the aperture deprives the burning candle flame of oxygen thereby extinguishing the burning candle flame. A timer controls the opening and closing of the aperture. The timer is set by a user to a desired amount of time that the candle flame is to burn for. After the preset amount of burn time has passed, the aperture automatically closes a sufficient amount (either partially or fully) to extinguish the burning flame of the candle.

16 Claims, 7 Drawing Sheets

DEVICE AND METHOD FOR EXTINGUISHING CANDLES

CROSS-REFERENCE TO RELATED APPLICATIONS

The present application claims the benefit of U.S. Provisional Patent Application No. 63/298,038, filed Jan. 10, 2022, the contents of which are incorporated by reference herein.

FIELD OF THE INVENTION

The subject matter disclosed herein relates in general to candles, and more specifically to a device and method for automatically extinguishing the burning flame of a candle after a user-defined preset amount of time has passed.

BACKGROUND OF THE INVENTION

Candles are ubiquitous, having been used for thousands of years as a source of light. Recently, candles have taken on more of a sleek and simplistic design, allowing them to be used to enhance esthetics in home décor. Also, scented or fragrant candles are being used for aromatherapy for relaxation and stress reduction, among other uses. However, a lighted candle is also an open flame and, thus, a potential fire hazard. Thousands of home structure fires occur each year in the U.S. with many more occurring around the world. Many of these fires are caused by the burning flame of a candle not being put out or extinguished properly and/or in a timely manner. It's easy for someone to fall asleep or forget about a burning candle in a room, thereby leaving the open burning flame unattended with the high potential for causing a harmful fire if the flame is not extinguished in a timely manner. Thus, candles today remain both immensely popular and also potentially hazardous.

Known, prior art candle extinguishing devices (aka "snuffers" or "douters") date back to the 1700's. These were relatively simple manually operated devices. More modern automatic devices are known which, in general, are operated mechanically to extinguish the burning flame of a candle (i.e., the burning wick of the candle). However, heretofore, no known device exists for automatically and reliably extinguishing the burning flame of a candle after a preset amount of time set by the user has passed and without the need for a human to check that the burning flame of the candle has indeed been extinguished, and all the while the device is safe, stylish, and easy-to-use. Thus, there is a need for a timed automatic candle extinguishing device that easily attaches to many popular sizes of candles.

BRIEF SUMMARY OF THE INVENTION

An object of embodiments of the present invention is to automatically and reliably extinguish the burning flame of a candle after a preset amount of time has passed.

Another object of embodiments of the present invention is to provide a device that automatically extinguishes the burning flame of a candle using a leaf shutter aperture to shut off or stop the supply or flow of oxygen to the candle flame after a preset amount of time has passed, thereby starving the flame.

Yet another object of embodiments of the present invention is to provide a device that automatically and reliably extinguishes the burning flame of a candle without the need for human intervention to be certain that the candle flame has indeed been extinguished, thereby removing the burden of extinguishing the burning candle flame from a human.

Still another object of embodiments of the present invention is to eliminate a potential fire hazard by automatically and reliably extinguishing the burning flame of a candle after a preset amount of time has passed.

Another object of embodiments of the present invention is to provide a device that is configured to readily and easily fit onto or attach to a standard size jar or container candle and is operable to automatically and reliably extinguish the burning flame of the jar candle.

Yet another object of embodiments of the present invention is to replace the standard lid on a jar candle with a device that automatically extinguishes the burning flame of the jar candle.

Still another object of embodiments of the present invention is to provide a device that automatically and reliably extinguishes the burning flame of a candle while at the same time having a relatively sleek, low-profile design that complements the design of the candle to which it is attached.

Another object of embodiments of the present invention is to provide a candle extinguishing device that can be configured in a number of different overall sizes to be engaged and operable with corresponding candles of many different sizes.

Yet another object of embodiments of the present invention is to provide a device that automatically and reliably extinguishes the burning flame of a candle while at the same time itself being fireproof and unaffected by the heat given off by the burning flame of the candle.

Still another object of embodiments of the present invention is to provide a device that automatically and reliably extinguishes the burning flame of a candle regardless of the remaining level or amount of material (e.g., wax) in the jar candle.

According to an embodiment of the present invention, a candle flame extinguishing device is configured to attach to an opening in a container for a candle. The device includes an aperture that is movable between open and closed (i.e., partially or fully closed) positions. The open position of the aperture facilitates the lighting of the candle wick and the burning of the candle flame. The closed position of the aperture deprives the burning candle flame of oxygen thereby extinguishing the burning candle flame. A timer controls the opening and closing of the aperture. The timer is set by a user to a desired amount of time that the candle flame is to burn for. After the preset amount of burn time has passed, the aperture automatically closes a sufficient amount (either partially or fully) to extinguish the burning flame of the candle.

BRIEF DESCRIPTION OF THE DRAWINGS

The subject matter, which is regarded as the disclosure herein of exemplary embodiments of the present invention, is particularly pointed out and distinctly claimed in the claims at the conclusion of this specification. The forgoing and other features and advantages of the present invention will become more apparent from the following detailed description taken in conjunction with the accompanying drawings in which:

DETAILED DESCRIPTION OF THE INVENTION

Figure 1:
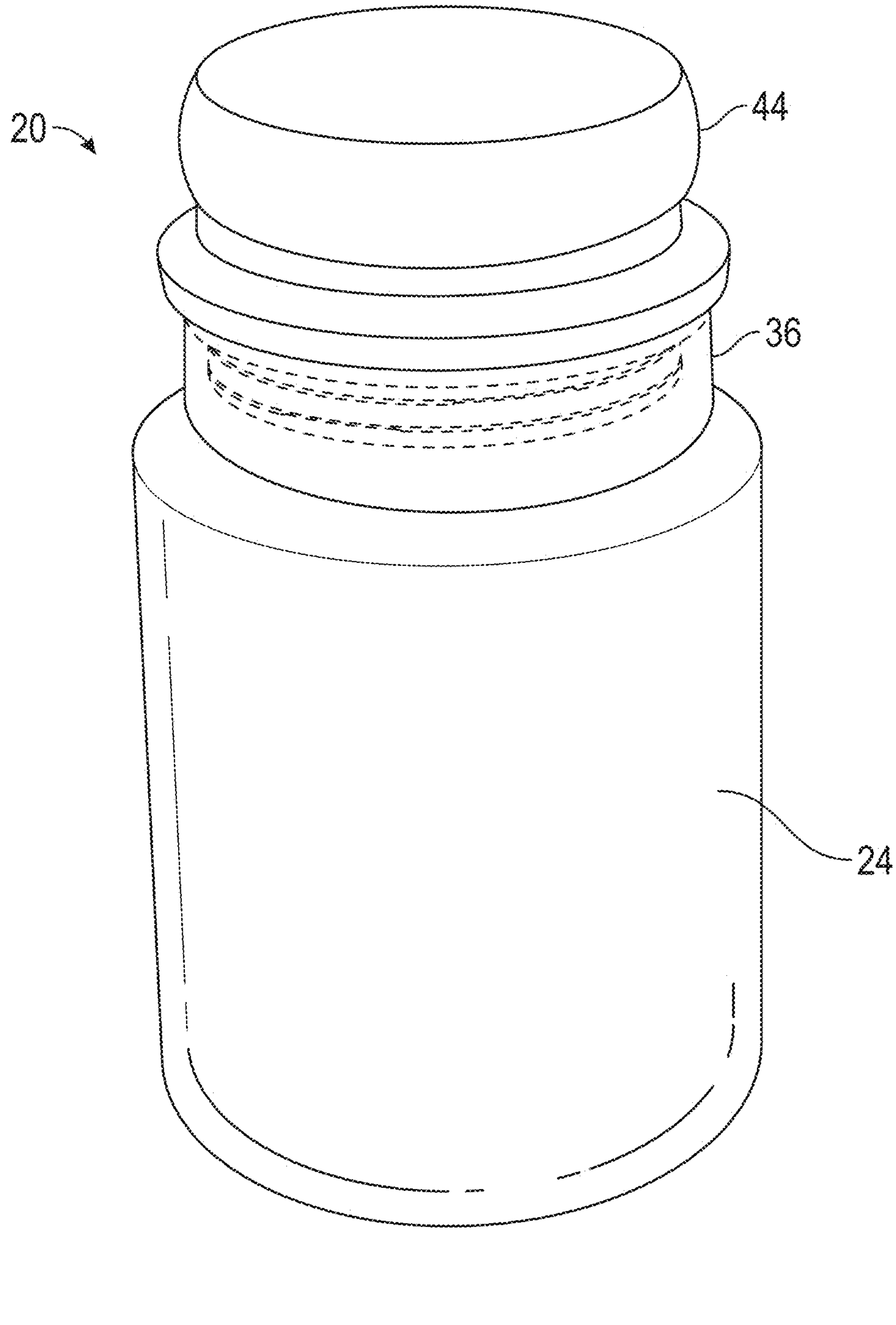
FIG. 1 (Prior Art)
FIG. 1 is a front elevational view of a jar candle.

It should be understood that, throughout this patent application and specifically in the written description that follows and in the accompanying drawing figures, various directional terms such as horizontal, vertical, up, down, upwardly, downwardly, front, back, top, bottom, upper, lower, left, right, and other similar terms as they are used herein refer to the candle extinguishing device of the various exemplary embodiments of the present invention as that device is oriented when it is typically attached to a candle (e.g. a glass jar candle). All of these terms are used in this written description and in the drawings for convenience only and as an aid to better understanding the exemplary embodiments of the present invention. These terms are not intended to be limiting or to imply that the candle extinguishing device must be used or positioned in any particular direction or orientation.

Figure 2:
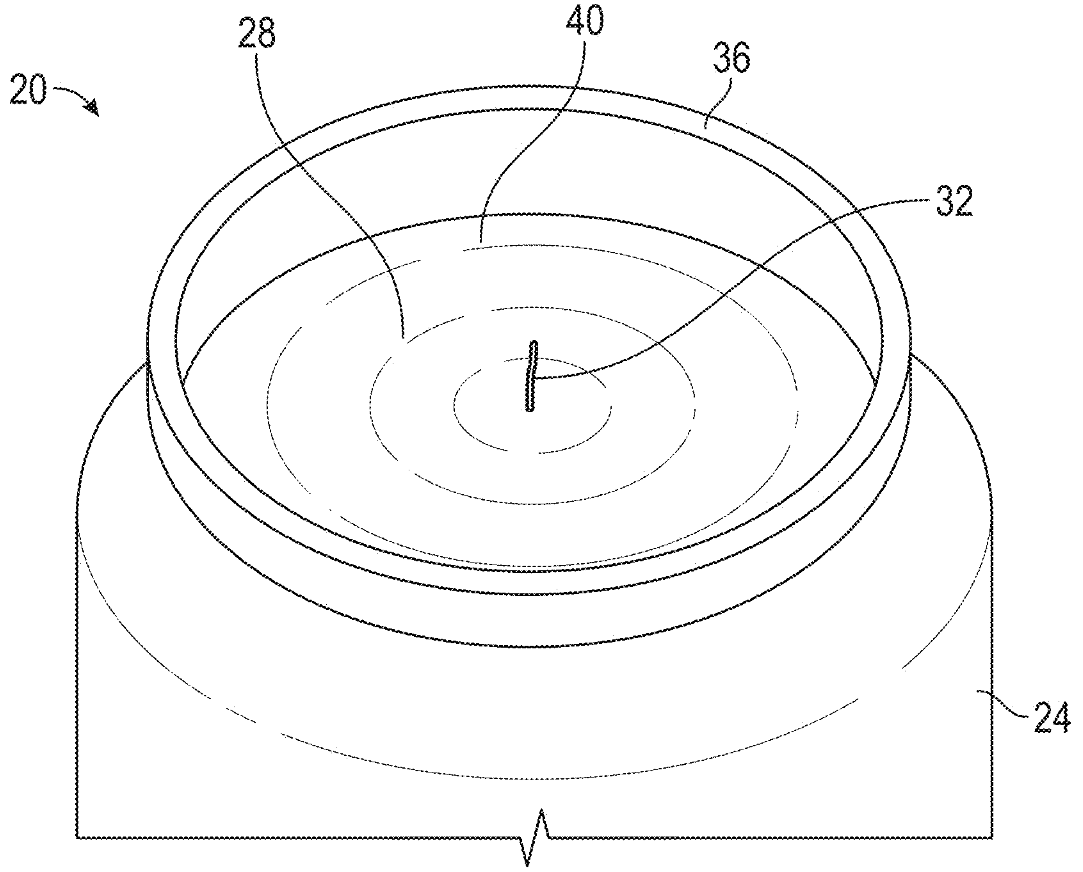
FIG. 2 (Prior Art)
FIG. 2 is a top perspective view of the jar candle of FIG. 1 with the lid removed.

Referring to FIGS. 1 and 2, there illustrated is a candle 20, which may comprise a well-known jar candle 20, such as the 22-ounce, large-size jar candle commercially available in a large variety of fragrances or scents from Yankee Candle®. Other size jar candles from Yankee Candle® and other candle manufacturers or marketers are commercially available as well, which may also be referred to as container candles or using similar terminology. The jar candle 20 includes a glass container 24 that holds or contains the candle material 28 to be burned. The candle material 28 typically comprises a paraffin wax, a beeswax, or other suitable substance, for example, a gel, an oil, or a vegetable wax such as soy. FIGS. 1 and 2 illustrate the container 24 as being full of candle material 28. A wick 32 is provided within the candle material 28. During burning of the candle 20, the wick 32 is lit on fire and the continuous burning flame of the wick 32 causes the candle material to melt and vaporize over time until no candle material 28 remains in the container.

The glass container 24 of the typical jar candle 20 has an upper flange portion 36 that is circular and defines a corresponding circular opening 40 in the top of the container 24. A user lights the candle 20 by lighting the wick 32. As the candle wick 32 burns, the amount of candle material 28 within the glass container 24 is slowly reduced over time through melting and vaporization.

A separate cover or lid 44 is provided that is configured to be inserted within the opening 40 and is operable to close off the opening 40. The upper flange portion 36 of the glass container 24 is illustrated as being a smooth surface (i.e., without any threads or other protrusions). As such, the lid 44 fits directly and snugly within the opening 40. Although not clearly shown in FIGS. 1 and 2, a gasket made from, e.g., plastic or silicone, may be disposed on the outer lower glass portion of the lid 44. The gasket, which may have spiral threads protruding around its outer perimeter similar to a screw, is operable to provide a tight fit of the lid 44 within the opening 40 to ensure that the lid 44 stays secured to the glass container 24.

Figure 4:
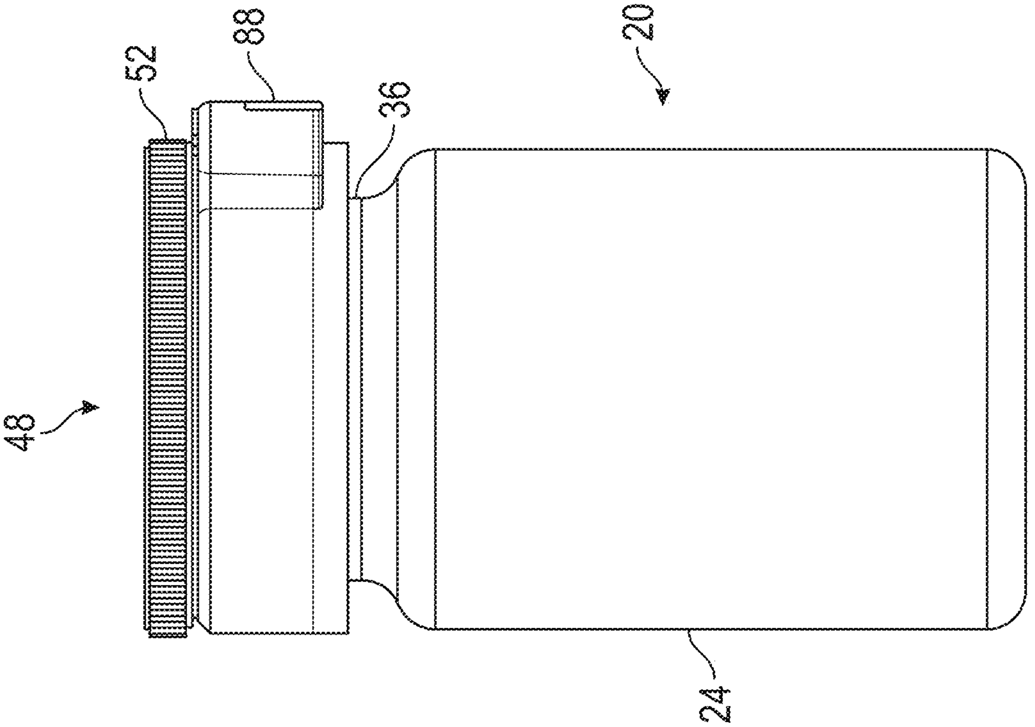
FIGS. 3 and 4 are top perspective and front elevational views, respectively, of the jar candle of FIGS. 1 and 2 with the jar candle having attached a device that automatically extinguishes the burning flame of the jar candle, according to an exemplary embodiment of the present invention.
Figure 3:
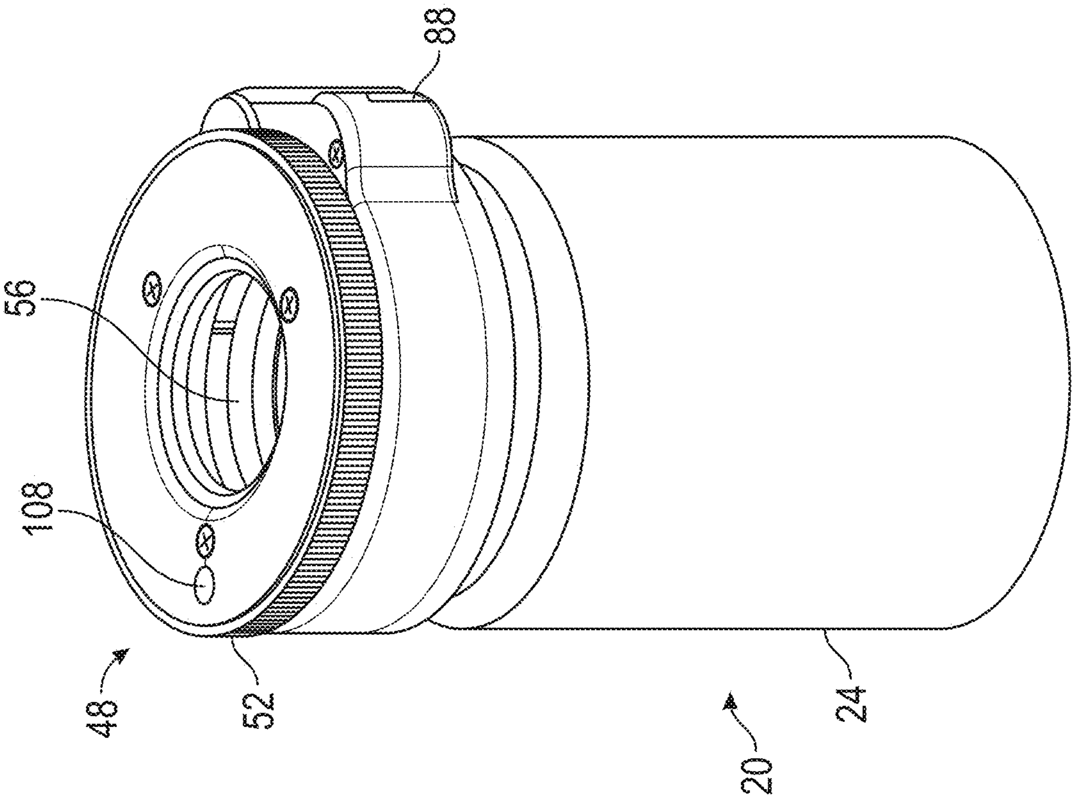

Referring to FIGS. 3 and 4, there illustrated is a candle flame extinguishing device 48 of exemplary embodiments of the present invention attached to the jar candle 20 of FIGS. 1 and 2. The extinguishing device 48 is attached or connected to the glass container 24 in place of the lid 44. More specifically, the extinguishing device 48 attaches to the glass container 24 by engaging the bottom portion of the device 48 around the outer surface of the upper flange 36 of the glass container 24, as described and illustrated in greater detail hereinafter. A snug or tight fit of the device 48 with respect to the container 24 ensures that the candle flame extinguishing device 48 is properly and adequately secured to the container 24 and does not easily get undesirably dislodged from its attachment to or connection with the jar candle 20. In exemplary embodiments, the device 48 is circular in shape to match the circular shape of the jar candle 20. However, the broadest scope of the present invention is not limited to a circular shape. Other shapes for the candle flame extinguishing device 48 may be utilized in light of the teachings herein, in particular when the shape of the candle 20 is not round.

Figure 8:
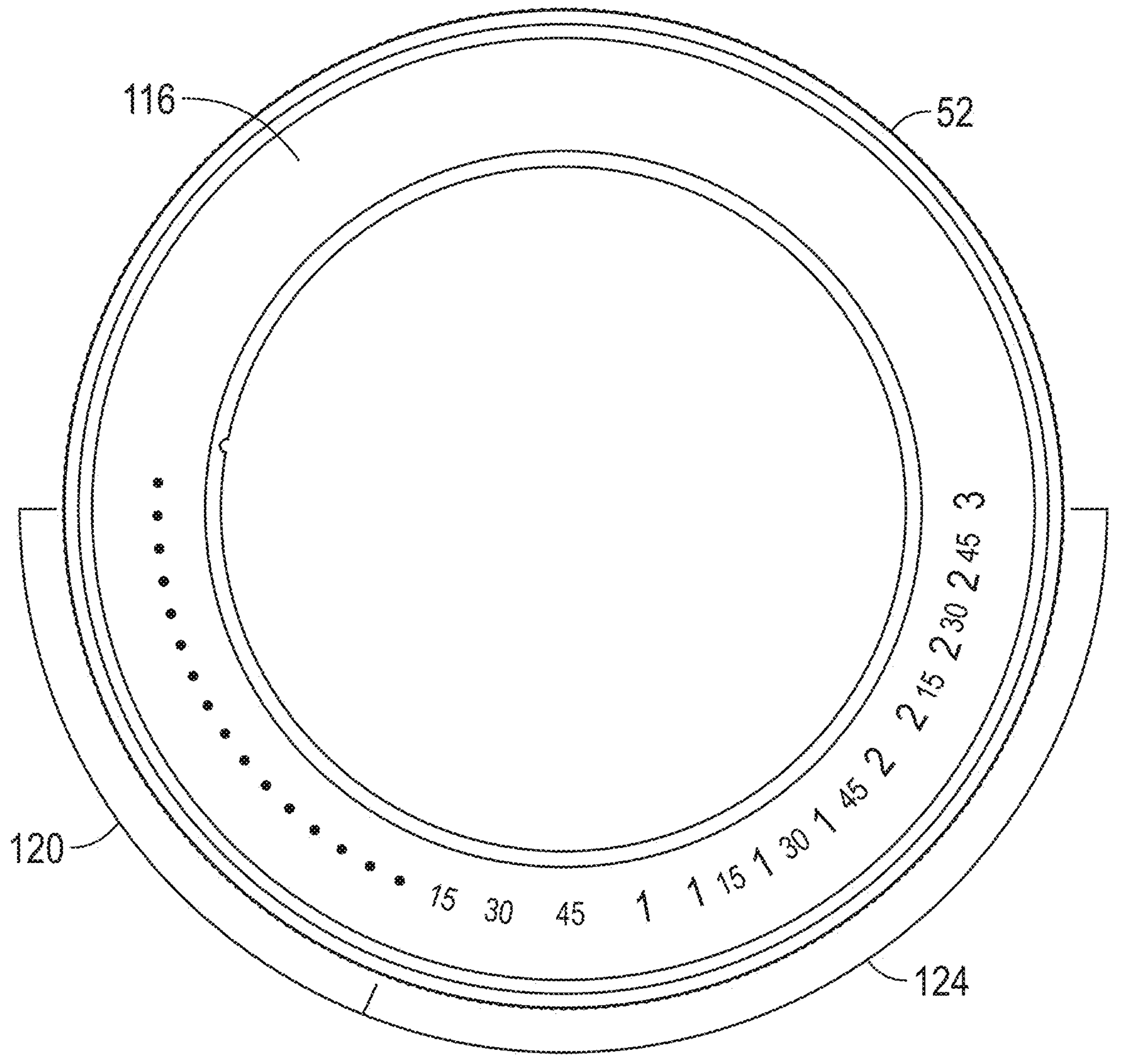
FIG. 8 is a top plan view of a dial having printed indicia on a surface, the dial being a part of the candle flame extinguishing device of FIGS. 3-7.

After the candle flame extinguishing device 48 is secured to the top of the jar candle 20, the device is operable, in general, by a user manually twisting or rotating a dial 52 of the device 48 in one direction (e.g., clockwise) when the user wants to light the wick 32 of the candle 20 at a desired time. This manual rotation causes an aperture 56 in the center of the device 48 to open, thereby exposing the candle material 28 and wick 32 below the device 48. This allows a user to light the wick 32 of the candle 20. The same manual rotation of the dial 52 also causes a mechanical timer 60 (FIG. 5) internal to the device 48 to be wound or preset to a desired amount of time selected by the user. This preset amount of time correlates to a desired amount of time that the jar candle 20 will burn before the device 48 automatically extinguishes the burning flame of the wick 32 of the candle 20 by closing the aperture 56 either partially or fully. The various amounts of time that the user can choose from are displayed to the user by a visual indicator, as best seen in FIG. 8.

The device 48 extinguishes the burning flame by partially or fully closing the aperture 56, thereby depriving the burning flame of oxygen. In some embodiments, the aperture 56 may not need to be closed fully to sufficiently deprive the burning flame of oxygen. Instead, the broadest scope of the present invention contemplates that the aperture be closed an amount that sufficiently deprives the burning flame of oxygen, thereby reliably and repeatedly extinguishing the burning flame of the candle 20. Thus, as used herein in describing the aperture 56, the term "closed' refers to a full or a partial closure of the aperture 56. Further, the device 48 automatically and reliably extinguishes the burning flame of the jar candle 20 regardless of the remaining level or amount of candle material 28 in the jar candle 20. The aperture 56 is closed by the dial 52 being rotated automatically by the timer 60 in a direction (e.g., counterclockwise) that is opposite to that direction (e.g., clockwise) which set the timer with a preset amount of time. A more detailed description of the operation of the candle flame extinguishing device 48 is provided hereinafter.

Figure 5:
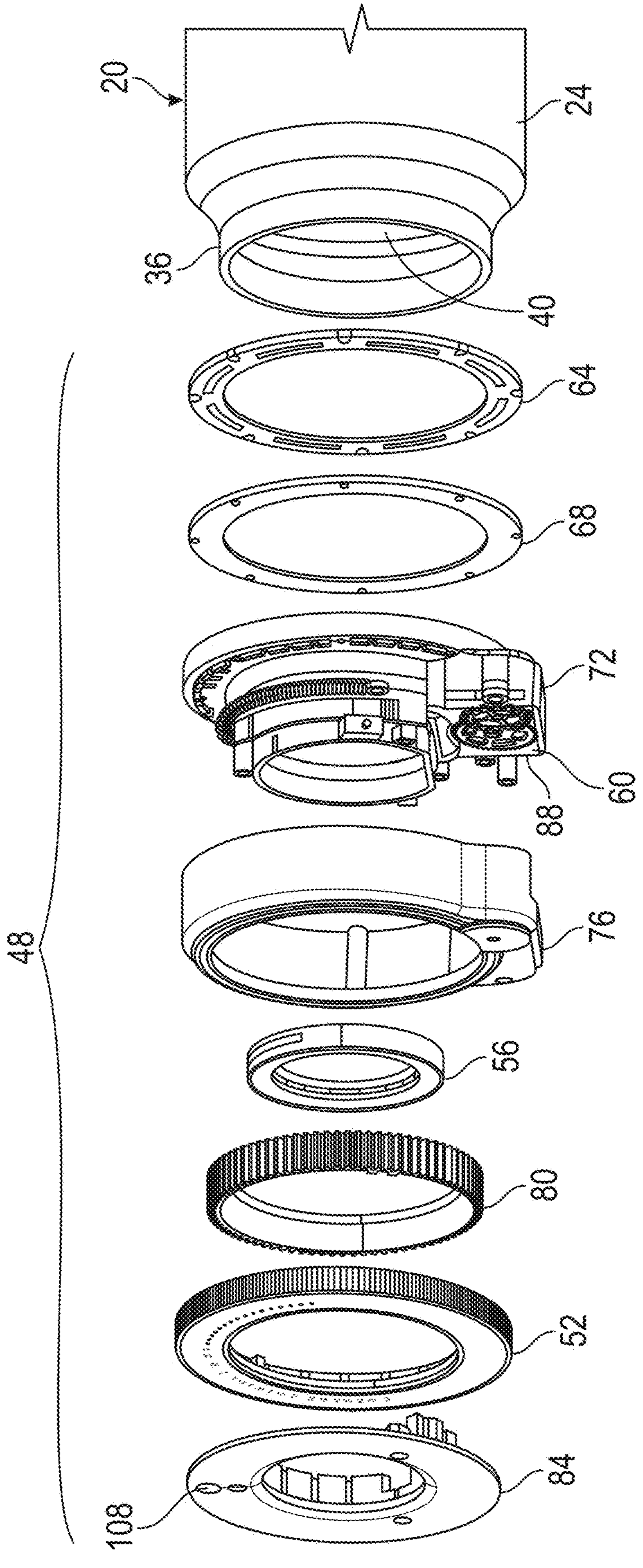
FIG. 5 is an exploded view of the various components of the candle flame extinguishing device of FIGS. 3 and 4.

Referring to FIG. 5, there illustrated is an exploded view of the various components of FIGS. 3 and 4 that comprise the candle flame extinguishing device 48. In exemplary embodiments of the present invention, the device 48 comprises primarily a mechanical device having mostly or all mechanical parts or components. Viewing the device 48 from right to left in FIG. 5, a bottom cover 64 and a gasket 68 attach to the outer surface of the flange 36 on the glass container 24 of the jar candle 20. A snug or tight fit of the device 48 with the jar candle 20 is thereby achieved. Next, the timer 60 is integrated together with an outer housing 72. Additional details of the timer 60 and the outer housing 72 are provided hereinafter. The gasket 68 and bottom cover 64 fit inside and attach to the bottom of the outer housing 72.

A top housing 76 is provided which fits over the timer 60 and outer housing 72. Next, the aperture 56 is integrated together with a dial gear 80, the dial 52, and a dial holder 84. These components 52, 56, 80, 84 may attach to the top housing 76 using, e.g., flat head screws. The dial holder 84 attaches or connects together the dial 52, the dial gear 80, and the aperture 56. As mentioned hereinbefore, the dial 52 is manually rotated by the user to an aperture open position and connects with and turns the dial gear 80. The dial 52 may have a textured outer surface around its perimeter to provide for better gripping by the user. The aperture 56 may comprise a leaf shutter aperture 56, similar to those used in cameras. The leaf shutter aperture 56 may comprise a plurality of leaves (e.g., sixteen) connected with a single arm in a known manner. In the embodiment of FIG. 5, the arm is connected with the dial gear 80. Then, movement of the dial gear 80 causes movement of the arm, thereby opening or closing of all of the aperture leaves in unison. The leaves of the aperture 56 are open until they are partially or fully closed by the passing of the preset amount of time.

Figure 6:
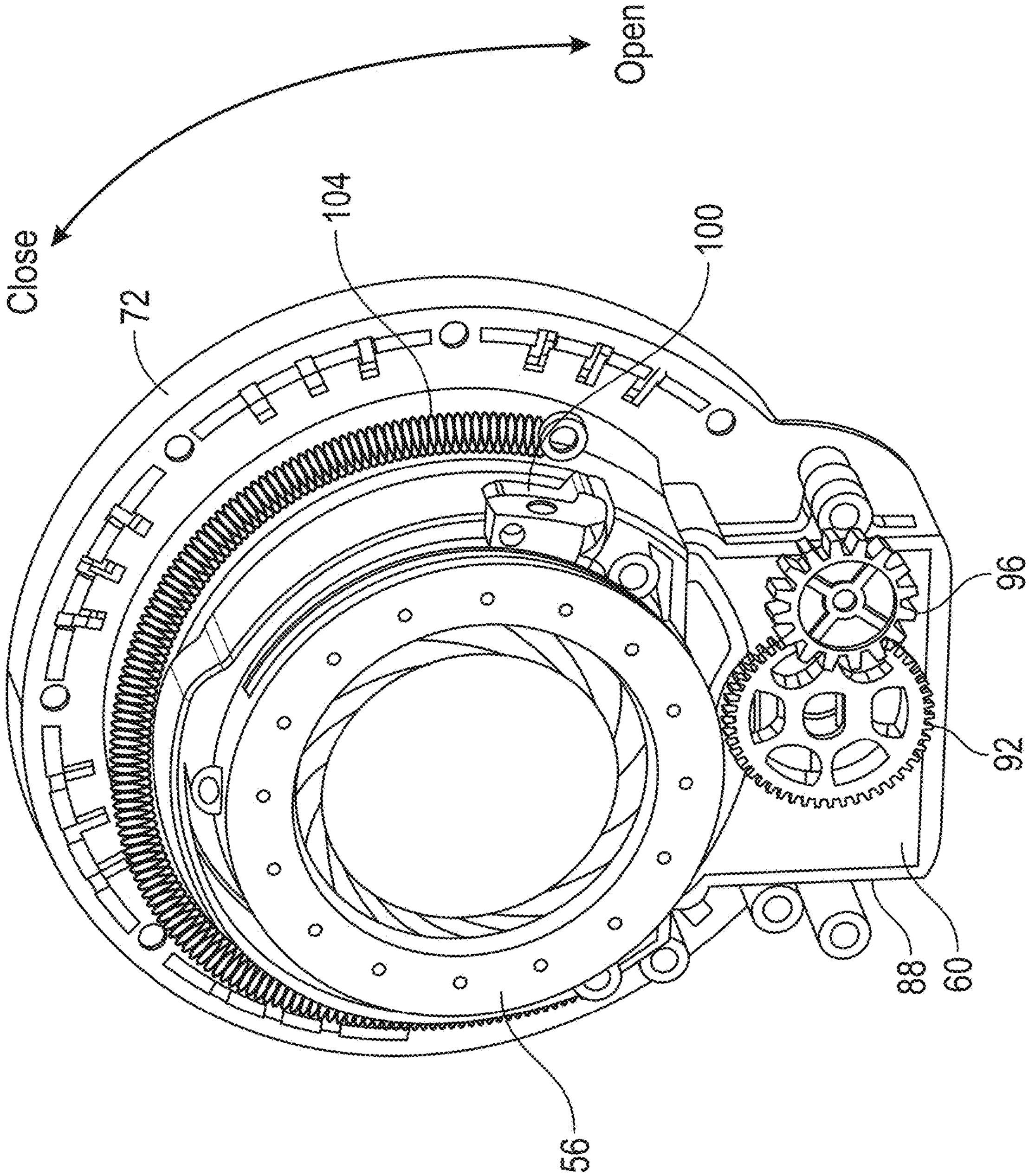
FIGS. 6 and 7 are top perspective and side elevational views, respectively, of several of the components of FIG. 5 connected together and operable within the candle flame extinguishing device of FIGS. 3 and 4.
Figure 7:
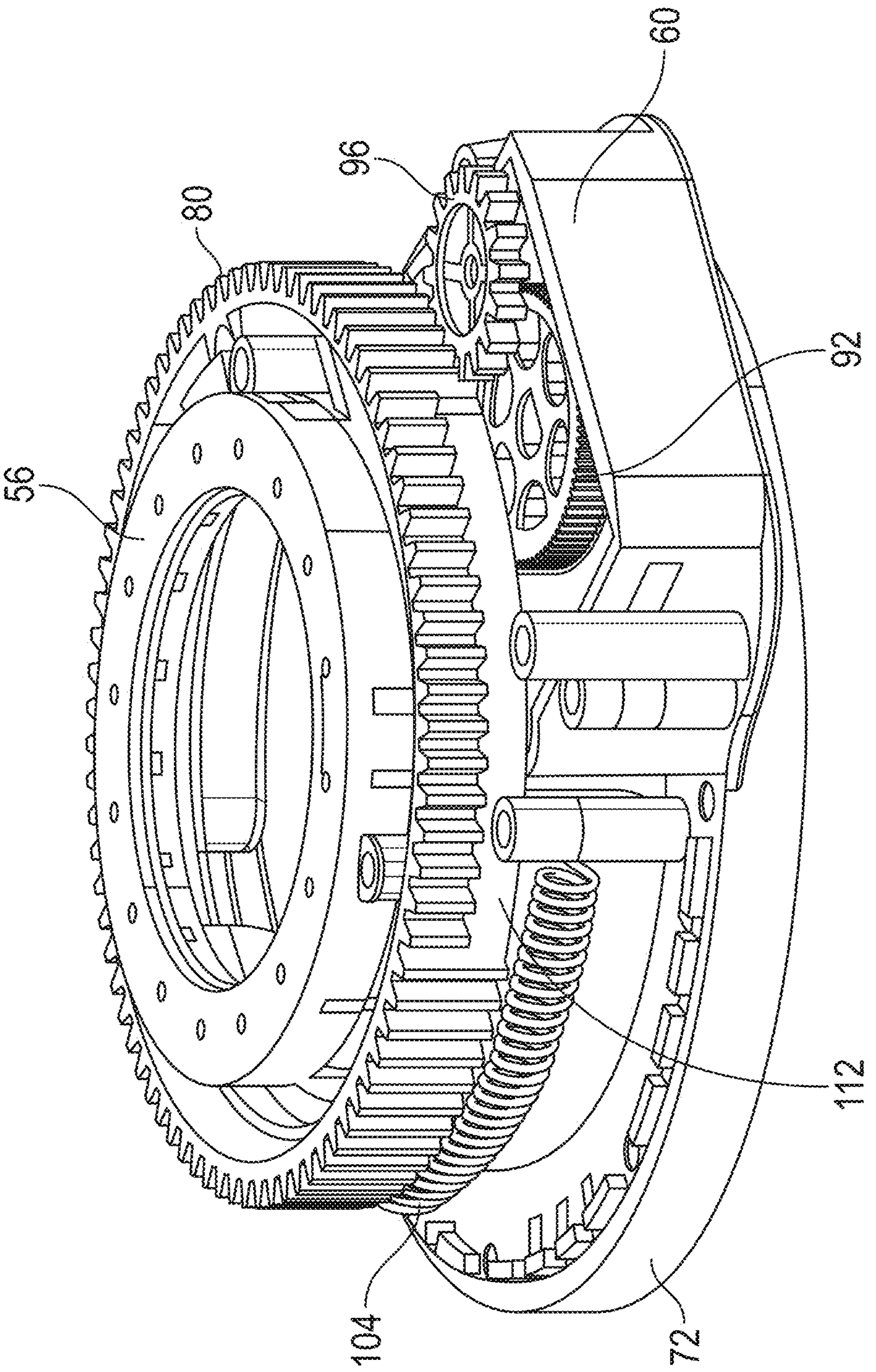

Referring to FIGS. 6 and 7, there illustrated in more detail is the timer 60 and the outer housing 72 connected together and also with the aperture 56. The timer 60 is disposed within a support structure 88 that holds the timer 60 in place. A rotatable output shaft of the mechanical timer 60 connects with the center hole of a driving gear 92 which connects with a staging gear 96. The staging gear 96 connects with and rotates the dial gear 80. A clutch 100 connects with a spring 104 and holds the arm of the aperture 56 in position.

To open the aperture 56 and set the timer 60 to a desired amount of time before the aperture 56 is automatically closed and the candle 20 is extinguished, the user manually rotates the dial 52 clockwise. More specifically, the dial 52 is rotated from an aperture closed starting position (as indicated by "Close" in FIG. 6) to an aperture opened ending position (as indicated by "Open" in FIG. 6). The approximate rotational distance between these two points is, e.g., 80 degrees. Once the dial 52 has been rotated that amount, the clutch 100 drops into a slot in the outer housing 72. At this point, the aperture 56 is fully opened. The user can then continue to manually rotate the dial 52 clockwise to set a desired amount of time that the timer 60 will count down, as described in more detail hereinafter with respect to FIG. 8.

As the timer 60 is counting down the preset amount of time, the dial 52 rotates counterclockwise slowly towards the "Open" position in FIG. 6. However, during this time the aperture 56 remains fully open. When the timer 60 has finished counting down the preset amount of time, the clutch 100 releases from the slot and the force exerted by the spring 104 partially or fully closes the aperture 56 relatively quickly. As best seen in FIG. 7, an empty angular area 112 of the dial gear 80 (i.e., an area 112 with no gear teeth) releases engagement with the staging gear 96 and allows the aperture 56 to rapidly close upon the application of force by the spring 104.

Referring to FIG. 8, there illustrated is the dial 52 having indicia printed on a top surface 116 of the dial 52. The indicia are indicative of the closed status of the aperture 56 as well as the then-current amount of time remaining within the timer 60 when the dial 52 is rotated both manually by the user to set a desired amount of time and automatically by the timer 60 when counting down the time. These then-current status indicia are visible through a circular hole or window 108 (FIGS. 3, 5) in the top surface of the dial holder 84. In this way, the indicia visually assist the user to accurately set a desired amount of candle burn time, and to also visually indicate to the user an amount of candle burn time remaining before extinguishing of the candle flame automatically occurs.

As seen in FIG. 8, starting at the approximate 9 o'clock position on the dial 52 and moving counterclockwise towards the approximate 7 o'clock position on the dial 52, a series of dots 120 are shown. In the exemplary embodiments of the candle flame extinguishing device 48 of FIGS. 3-7, the timer 60 is set in 15-minute time period increments, which is purely exemplary. Other increments of time may be utilized. The user is required to initially set the timer to at least a first 15-minute increment by rotating the dial 52 clockwise while observing the indicia visible inside the window 108. As the user rotates the dial 52 clockwise, the user sees one of the dots 120 in the window 108. The presence of one of the dots 120 in the window 108 indicates to the user that the timer 60 has not yet reached the first 15-minute increment setting. The user then continues to rotate the dial 52 clockwise until no more dots 120 are visible, which occurs at approximately the 7 o'clock position.

In addition, when the user starts to rotate the dial 52 clockwise from the approximate 9 o'clock position, the aperture 56 begins to open. Then when the dial 52 is rotated to approximately the second to last dot position near the 7 o'clock position, the aperture 56 is locked in the open position. Also at this position, the timer 60 starts being wound.

Beginning at the approximate 7 o'clock position and moving counterclockwise to the approximate 3 o'clock position, a series of numbers 124 are shown. In the exemplary embodiment of FIG. 8, each number indicates a 15-minute increment or period of time. The last number in the counterclockwise rotation is "3" which indicates a three-hour maximum amount of time that the user can set for the timer 60. However, this three-hour maximum is purely exemplary. Other maximum amounts of time for the timer 60 may be utilized. As the timer moves the dial 52 counterclockwise as the time counts down, one of the numbers 124 is visible to the user either entirely or partly in the window 108. The number 124 visible in the window 108 indicates the amount of time remaining in the timer 60 and until the candle flame is automatically extinguished by the device 48.

It should be understood that use of the window 108 to display the indicia is purely exemplary. Other means for displaying the indicia are contemplated by the broadest scope of the present invention. For example, the indicia may be displayed on the outer perimeter of the top housing—e.g., on the textured outer surface of the dial 52. Also, indicia other than dots or numbers may be used. Further, indicia other than or in conjunction with visual indicia may be provided to the user (e.g., audible).

The various components comprising the candle flame extinguishing device 48 of exemplary embodiments of the present invention may be made from a rigid material such as a metal (e.g., aluminum or steel) or a high temperature plastic. The metal provides the device 48 with a weighted, high-quality feel. For device components that are relatively close to the burning candle flame, aluminum may be used for structure parts, and zinc casting with chrome plating may be used for cosmetic parts. The high temperature plastic may be used for device components that are relatively far away from the burning candle flame. The high temperature plastic may comprise, for example and without limitation, polybutylene terephthalate with glass fiber, or polyphenylene sulfide. However, it is to be understood that the various components comprising the device 48 may be made from any suitable and durable high temperature materials, including those that are light weight. In general, all of the components comprising the candle flame extinguishing device 48 of embodiments of the present invention must meet the consumer and fire safety regulations, laws, and standards of the United States and of its various states, along with similar fire safety regulations of each of the various countries that the device 48 will be marketed, sold, and utilized in.

The candle flame extinguishing device 48 of exemplary embodiments of the present invention has been described and illustrated as having a mechanical timer 60 that is disposed in a support structure 88 which juts out from the device 48 (FIGS. 3-4). However, the use of such a specific mechanical timer 60 is not a part of the broadest scope of the present invention. Instead, the gears of the timer can be rearranged to fit around the perimeter of the bottom housing component of the device 48, thereby allowing the overall device 48 to have a fully cylindrical shape. To this end, a ratchet and pawl mechanism may be utilized to control the locking (i.e., opening) and unlocking (i.e., closing) of the aperture 56. The use of such a ratchet and pawl mechanism within the candle flame extinguishing device 48 should be apparent to one of ordinary skill in the art in light of the teachings herein.

In addition, it should be understood that the use of a mechanical timer 60 as described and illustrated herein is exemplary and is not a part of the broadest scope of the invention. The timer 60 may be other than a mechanical timer—for example, the timer 60 may comprise a digital or analog electronic timer. As such, the digital timer may allow for integration with a circuit board to allow for control of the device 48 via a digital screen interface or via a mobile app on a phone.

Also, the use of a spring 104 to open and close the aperture 56 is exemplary. Instead, a motor could be used to open and close the aperture 56.

Further, the broadest scope of the present invention contemplates other ways that the candle flame extinguishing device 48 may attach to the jar candle 20. For example, threads similar to those of a standard canning jar and lid may be utilized. Also, the device 48 may be permanently attached to the jar candle 20 as a single container and device from a mold. In addition, the device 48 may magnetically attach to the candle 20 using a magnetic metal rim around the container 24 to attract magnets embedded in the bottom/inner housing of the device 48. Also, a rubber strap and latch system may be used to secure the device 48 to the container 24. Further, a rubber/metal clamp similar to a hose clamp may be used to tighten the device 48 around the container 24.

In addition, instead of use of a twisting motion of the dial 52 to set the desired amount of time for the timer 60, a different motion may be used, e.g., utilizing an actuator engaging with the timer staging gear 96, or allowing for the pressing down on the device 48 to wind the timing staging gear 96, or use of a small lever attached to a 90 degree right angle transmission that winds the timer staging gear 96 as the lever is pulled down.

Also, although not shown or described hereinbefore, the device 48 may include an "override" mechanism or electronic means that allows the user to close the aperture 56 at any time prior to the passage of the preset amount of time in the timer 60. For example, the user can press or switch a button or lever which disengages the clutch 100 or releases the pawl in the ratchet/pawl mechanism. If a digital electronic embodiment is utilized as part of the device 48, then a user command through an app or through use of an electronic switch can be used to close the aperture 56 at any time.

The exemplary embodiments of the candle flame extinguishing device 48 described and illustrated herein have been described as having a leaf shutter aperture 56. However, the broadest scope of the present invention is not limited as such. Instead, the aperture 56 may comprise a fire-resistant cloth, a thin, flexible high-temperature plastic sheet, or other similar materials. The cloth or sheet acts as a curtain and is pulled open or shut by the arm that is attached to the aperture 56. Similar to the leaf shutter aperture 56, when the dial is twisted, the cloth or sheet curtain will open allowing oxygen to flow to the candle flame thereby allowing the candle flame to burn. When the desired amount of time has passed, the arm will disengage and the spring will drive the arm back to the stop, closing the curtain and starving the flame of oxygen, thereby extinguishing the flame of the candle 20.

It should be understood by one of ordinary skill in the art that the exemplary embodiments of the candle flame extinguishing device 48 described and illustrated herein are not limited for use with a standard size 22-ounce jar candle 20. Instead, it should be readily apparent in light of the teachings here that the candle flame extinguishing device 48 and its various components of the device 48 can be appropriately sized to fit different sized candles 20. Further, a locking mechanism may be incorporated into the device 48 or used alongside the device 48 to prevent the unwanted or unauthorized opening of the aperture 56. For example, a padlock or other type of mechanical lock may be utilized to prevent the twisting of the device 48 and thereby prevent the opening of the aperture 56 and winding of the timer 60 until the lock is unlocked, e.g., with a key. A digital lock may be incorporated requiring a passcode or fingerprint/retina scan to allow the aperture 56 to be opened and the timer 60 set.

As described and illustrated herein, the device 48 of the various exemplary embodiments of the present invention is used primarily for extinguishing the burning flame of a candle 20 by selectively shutting off the supply of oxygen to the candle flame. However, it is to be noted that the device 48 of embodiments of the present invention is not limited as such. Instead, the device 48 of the present invention may be used in other applications in which, in general, it is desired to control the provision of air, oxygen, or other gases, or of radiation such as visible or invisible light, or of other physical quantities such as water or liquids, to a medium or an end point using an aperture 56 that can be controlled between open and closed positions. For example, the device 48 may be attached to an end of a pipe or duct and a time is set to control air flow therethrough by controlling the opening or closing of the aperture 56. Similarly, the device 48 may be attached to a container (e.g., a jar) containing plants or other organisms to control an amount of sunlight or oxygen exposure to the plants by again controlling the opening or closing of the aperture 56. In addition to controlling radiation such as light for ajar containing organic material, the device 48 may also be enlarged in size to control light coming through a window, thereby controlling the amount of light entering a room in a house for example.

The device 48 may also be used to control the visual perspective of and/or to provide protection to a medium. For example, the device 48 may be placed in front of or attached to or incorporated into a painting, thereby allowing a timed control of the visual perspective to a viewer of the painting (or to control how long the painting can be viewed). The device 48 may also be used to provide protection of a painting from light, dust, vandalism, etc. after a set amount of time. Other medium examples include a television, projector, laptop/other screened devices, picture frame, and watch/clock. Further, the device 48 may be used to control access to a given item or space. For example, the device 48 may be attached to a cookie jar, allowing timed control of access to the cookies in the jar. The device 48 may also be enlarged in size to act as a door, granting access to a given area for a set amount of time.

Other contemplated embodiments of the broadest scope of the present invention include enlarging the size of the device 48 and using appropriate high-temperature resistant materials. This would allow the device 48 to be able to attach, to cover, or be molded or forged to a fire pit to control the time of burning of the material within the fire pit by allowing for a timed extinguishment of the fire pit flame by starving the fire of oxygen.

The terminology used herein is for the purpose of describing particular embodiments of the invention only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention is provided in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that the exemplary embodiments may include only some of the described exemplary aspects. Accordingly, the invention it not to be seen as limited by the foregoing description but is only limited by the scope of the appended claims.

The invention claimed is:

1. A device for extinguishing a burning flame of a candle, comprising:

a housing configured to connect with a container of the candle, the container configured to hold an amount of candle material having at least one wick located therein to facilitate the melting and vaporizing of the candle material over time after the wick is lit on fire and the burning flame of the wick ensues;

an aperture located within the housing, the aperture being operable to be controlled between an open position and a closed position, wherein when in the open position the aperture allows the flame of the wick to continue burning, wherein when in the closed position the aperture does not allow the flame of the wick to continue burning; and a timer located within the housing, the timer being operable to be set by a user to a predetermined amount of candle burn time, wherein prior to the expiration of the predetermined amount of candle burn time the timer is operable to control the aperture in the open position to allow the flame of the wick to continue burning, wherein upon the expiration of the predetermined amount of candle burn time the timer is operable to control the aperture to the closed position to no longer allow the flame of the wick to continue burning, and wherein prior to the timer being set to the predetermined amount of candle burn time the timer is operable to control the aperture to the open position;

wherein the aperture comprises a leaf shutter having a plurality of leaves that open and close together in unison, thereby causing the aperture to be in the open position and the closed position, respectively, when controlled the timer; and wherein the timer further comprises indicia provided to the user, wherein the indicia indicate amounts of time within the timer that correspond to differing amounts of the predetermined amount of candle burn time to be selected and set by the user or differing amounts of time remaining within the predetermined amount of candle burn time as the candle flame is burning, wherein the indicia comprise one of visual indicia or audible indicia.

2. The candle flame extinguishing device of claim 1, wherein the closed position of the aperture is when the aperture is fully closed.

3. The candle flame extinguishing device of claim 1, wherein the closed position of the aperture is when the aperture is partially closed.

4. The candle flame extinguishing device of claim 1, wherein the candle container comprises a circular shape and the housing comprises a circular shape.

5. The candle flame extinguishing device of claim 1, wherein the aperture is manually controlled to the open position at any time by the user, and wherein the aperture is mechanically controlled to the closed position upon the expiration of the predetermined amount of candle burn time.

6. The candle flame extinguishing device of claim 1, further comprising an override mechanism, wherein the aperture is mechanically controlled to the closed position at any time by the user activating the override mechanism.

7. The candle flame extinguishing device of claim 1, further comprising a locking mechanism that is operable to prevent opening of the aperture while the locking mechanism is enabled.

8. The candle flame extinguishing device of claim 1, wherein the timer comprises a mechanical timing device operable to be mechanically set by a user to the predetermined amount of candle burn time through activation of the mechanical timing device in a first predetermined manner.

9. The candle flame extinguishing device of claim 8, wherein the first predetermined manner of activating the mechanical timing device comprises a rotational winding of the mechanical timing device in a first rotational direction.

10. The candle flame extinguishing device of claim 8, wherein after activation of the mechanical timing device to set the timer to the predetermined amount of candle burn time, the mechanical timing device counts down in time until the expiration of the predetermined amount of candle burn time is achieved.

11. The candle flame extinguishing device of claim 10, wherein upon expiration of the predetermined amount of candle burn time, the mechanical timing device is operable to control the aperture to the closed position to no longer allow the flame of the wick to continue burning.

12. The candle flame extinguishing device of claim 11, wherein the mechanical timing device is operable to control the aperture to the closed position to no longer allow the flame of the wick to continue burning by shutting off the supply of oxygen to the burning flame of the wick.

13. The candle flame extinguishing device of claim 8, wherein the mechanical timing device comprises one of an arrangement of a plurality of gears and a spring or a motor, or a mechanism including a ratchet and a pawl.

14. The candle flame extinguishing device of claim 1, wherein the timer comprises an electronic timing device operable to be set by a user to the predetermined amount of candle burn time.

15. An access control device which provides for controlled access to a medium by a person, a device, or a material, comprising:

an aperture located at a position of selective access to the medium, the aperture being operable to be controlled between an open position and a closed position, wherein when in the open position the aperture allows access to the medium, wherein when in the closed position the aperture does not allow access to the medium; and a timer configured to be connected with the aperture, the timer being operable to be set by a user to a predetermined amount of medium access time, wherein prior to the expiration of the predetermined amount of medium access time the timer is operable to control the aperture in the open position to allow access to the medium, wherein upon the expiration of a predetermined amount of candle burn time the timer is operable to control the aperture to the closed position to no longer allow access to the medium, and wherein prior to the timer being set to the predetermined amount of medium access time the timer is operable to control the aperture to the open position;

wherein the aperture comprises a leaf shutter apparatus having a plurality of leaves that open and close together in unison, thereby causing the aperture to be in the open position and the closed position, respectively, when controlled by the timer; and wherein the timer further comprises indicia provided to the user, wherein the indicia indicate amounts of time within the timer that correspond to differing amounts of the predetermined amount of medium access time to be selected and set by the user or differing amounts of time remaining within the predetermined amount of medium access time, wherein the indicia comprise one of visual indicia or audible indicia.

16. The access control device of claim 15, wherein the medium is one from the group comprising an item housing a burning fire, a painting, a work of art, an image viewing device, and an item storage device.

* * * * *